United States Patent
Weiner

(10) Patent No.: US 7,099,457 B2
(45) Date of Patent: Aug. 29, 2006

(54) PERSONAL RING TONE MESSAGE INDICATOR

(75) Inventor: Moshe Weiner, Kiryat Savionim Yehud (IL)

(73) Assignee: Comverse Ltd., Tel Aviv (IL)

( * ) Notice: Subject to any disclaimer, the term of this patent is extended or adjusted under 35 U.S.C. 154(b) by 768 days.

(21) Appl. No.: 09/906,085

(22) Filed: Jul. 17, 2001

(65) Prior Publication Data

US 2003/0016813 A1   Jan. 23, 2003

(51) Int. Cl.
*H04M 1/00* (2006.01)
*H04M 3/00* (2006.01)

(52) U.S. Cl. .......................... 379/373.01; 379/374.01; 379/374.02; 379/374.03; 379/375.01; 379/376.01

(58) Field of Classification Search .... 379/372–375.02
See application file for complete search history.

(56) References Cited

U.S. PATENT DOCUMENTS 5,548,802 A * 8/1996 Barnes et al. ................. 455/15
6,400,958 B1 * 6/2002 Isomursu et al. ........... 455/466
6,775,273 B1 * 8/2004 Kung et al. .................. 370/356
2002/0006792 A1 * 1/2002 Usher et al. ................ 455/426
2002/0110224 A1 * 8/2002 Kovales et al. ............ 379/67.1

FOREIGN PATENT DOCUMENTS

| EP | 0 851 649 | 7/1998 |
| EP | 1 117 245 | 7/2001 |
| WO | WO 00/36857 | 6/2000 |
| WO | WO 01/28221 | 4/2001 |
| WO | WO-200128221 A1 * | 4/2001 |

\* cited by examiner

*Primary Examiner*—Fan Tsang
*Assistant Examiner*—Ramnandan Singh
(74) *Attorney, Agent, or Firm*—Sughrue Mion, PLLC

(57) ABSTRACT

A system and method of message indicating that enable the sender of a message to chose the ringing tone of the receiver's cellular telephone upon arrival of the sender's message. The sender has the ability to either choose or create the ringing tone to be played on the receiver's cellular telephone. The sender also has the ability to create either SMS or multimedia messages to be sent with the ringing tone. The ringing tones may also be chosen or downloaded from Internet sites.

66 Claims, 3 Drawing Sheets

PERSONAL RING TONE MESSAGE INDICATOR

BACKGROUND OF THE INVENTION

1. Field of the Invention

The present invention relates generally to a multimedia messaging service ("MMS") application and more specifically to using a multimedia messaging service based application to personalize the ring tone of a receiver's telephone to indicate the presence of a message.

2. Description of Related Art

Multimedia messaging service provides the ability to send and receive messages comprising a combination of text, sounds, images and video to Multimedia Service capable handsets and computers. MMS is a component that can be connected to all possible networks such as cellular networks, broadband networks, fixed line and Internet networks. As technology has evolved so has the needs of its senders. Senders, such as cellular telephone senders, demand more out of their messaging service. They require the ability to send and received such items as business cards, post cards and pictures.

Accordingly, MMS was developed to provide enhanced messaging, based on the senders' new demands. In the 3G cellular ($3^{rd}$ generation of cellular communication specifications) architecture, MMS has been added. As stated above, this allows senders of cellular telephones to send and receive messages exploiting a whole array of media types while also making it possible to support new content types as they become popular. MMS is well known in the art and has been standardized in the telecommunication world (see standard 23.140, of release 2000 of the 3GPP-3G Partnership Project as it appears in European Telecommunications Standards Institute (incorporated herein by reference). For current standards see ETSI at 650, route des Lucioles, 06921 Sophia Antipolis, France, Telephone No. +33 4 92 94 42 00, Fax +33 4 93 65 47 16, secretariat@etsi.fr).

Mobile Originated Short Messaging Service ("MO-SMS") is a messaging service that allows a cellular telephone sender (the "sender") to send text messages to another cellular telephone sender (the "receiver"). When the sender sends a message to the receiver, the receiver's cellular telephone indicates that a message has arrived by using the ringing tone set by the receiver. Said differently, the receiver chooses to set the ringer on his cellular telephone to a particular ringing tone which in turn is played every time any message is received regardless of who sent the message.

Today, most mobile telephone senders can select a ring tone from several ring tones that come with their cellular telephones, i.e. ring tones that are predefined by the mobile telephones' manufactures. Ring tones can also be downloaded from various sources, such as the Internet, into many mobile telephones. Additionally, both some mobile telephones allow senders to edit their own ringing tone by specifying the musical notes or tones to be played.

The SMS standard as it exists today transfers the message to the receiver's cellular telephone, but it does not enable automatic instant play of the messages (i.e. each message is not played immediately upon receipt by the mobile telephone). This means that the sender may send a personal tone as part of an SMS message (e.g. the letters chosen by the sender represent musical tones, for example the letter C represents the musical tone "Do", D represents "Re" and E represent "Me" . . . . The handset converts the letters to musical notes and plays the corresponding musical notes.), but the personal tone will not cause the receiver's cellular telephone to ring automatically using the sender's personal ringing tone. Rather, the receiver is only able to hear the sender's personal tone after the message is played. In other words, the sender's personal ringing tone is not the ringing tone that is played by the receiver's cellular telephone to indicate the arrival of the senders message.

SUMMARY OF THE INVENTION

The present invention solves the problems and shortcomings attendant with known messaging services by providing a messaging application that gives a sender the ability to send a personalized ringing tone that will cause a receiver's cellular telephone to ring using the sender's personalized ringing tone upon arrival of the sender's message. Further, the invention provides a messaging application that allows a mobile telephone to play a sender's personalized ringing tone upon the arrival of the sender's message. Said differently, the sent message contains two parts. The first part is the sender's personalized ringing tone while the second part is that actual text that the sender wants the receiver to read.

The present invention further solves the above-described problems and limitations by enabling sender to choose the ringing tone that will ring when his message arrives at the receiver's cellular telephone. This allows the receiver to know instantly whom the message is from simply by hearing the ringing tone of his cellular telephone.

In a preferred embodiment of the present invention, a sender enters a messaging service using the sender's cellular telephone. The sender then chooses to use an already created ringing tone from an MMS server or to edit his own ringing tone by using a ringing tone editing server. Then, the sender creates his message using either a regular SMS message server or an MMS message server. The message is then sent to a receiver and the sender's chosen ringing tone serves as an automatic play-SMS message and the content of the message the sender has created is sent as a regular SMS or as a multimedia message. The receiver will automatically hear the sender's indicating ringing tone, and can choose whether to read the received message.

In another embodiment of the present invention, the sender uses a personal computer or a fixed telephone to gain access to the messaging servers.

In yet another embodiment of the present invention, the sender chooses or downloads a ringing tone from an Internet source.

Further objects, features and advantages of the invention will become apparent from a consideration of the following description and the appended claims when taken in connection with the accompanying drawings.

BRIEF DESCRIPTION OF THE DRAWINGS

The above aspects of the present invention will become more apparent by describing in detail embodiments thereof with reference to the attached drawings, in which.

DETAILED DESCRIPTION OF THE PREFERRED EMBODIMENTS

Hereinafter, embodiments of the present invention will be described in detail with reference to the attached drawings.

The present invention is not restricted to the following embodiments, and many variations are possible within the spirit and scope of the present invention. The embodiments are provided in order to more completely explain the present invention to one skilled in the art.

Figure 1:
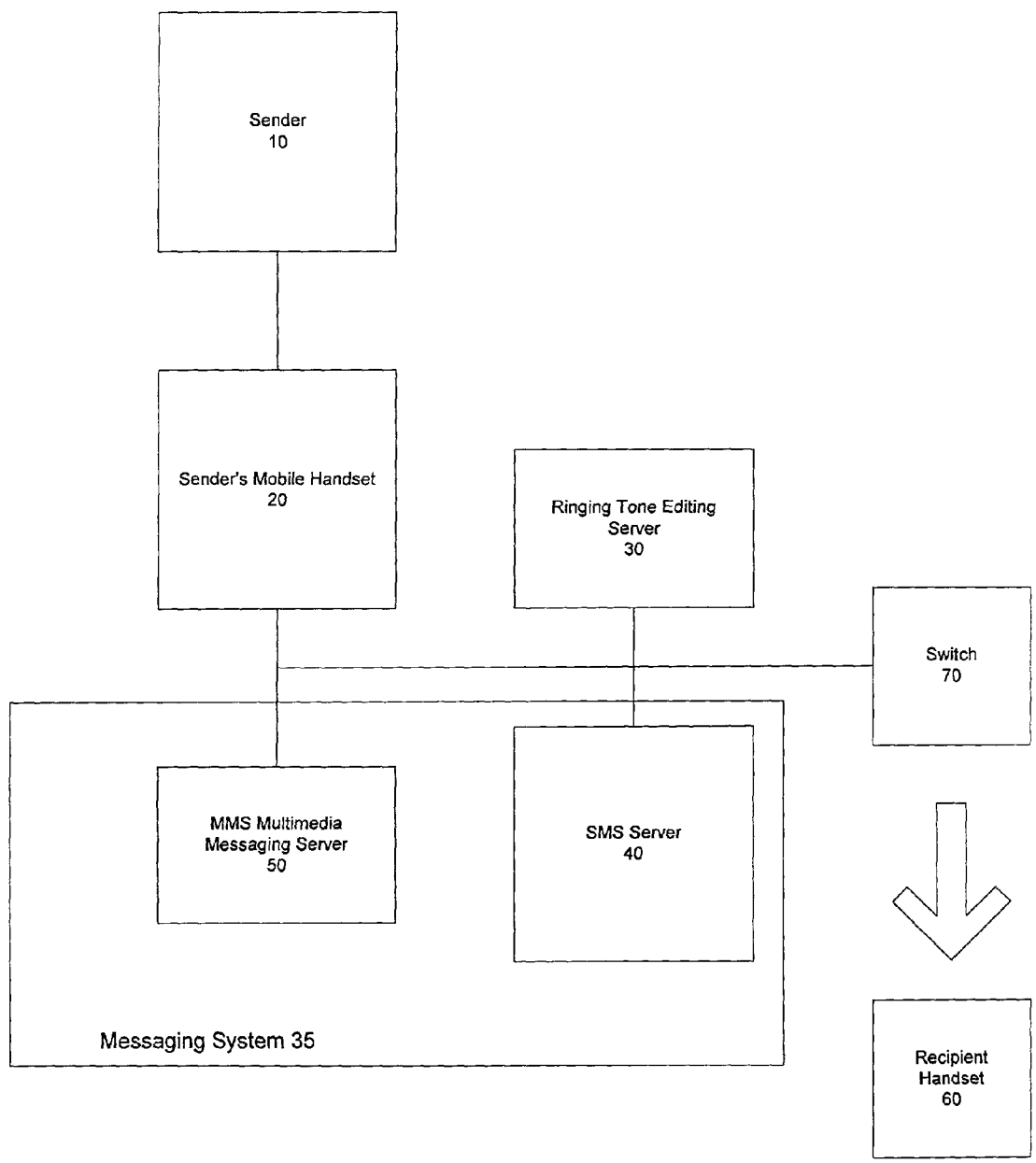
FIG. 1 is a block diagram illustrating the interrelationships between the components of the personalized indicating ringing tone system of the present invention.

Referring to FIG. 1, a sender 10 using, for example, the sender's mobile handset 20 accesses the messaging system 35 of the present invention. In this embodiment, the sender 10 uses a mobile handset 20 but this should not be construed as a limitation. The sender 10 may, for example, also gain access to the messaging system 35 using other terminals such as a personal computer or a fixed telephone.

Once the sender 10 gains access to the messaging system 35 of the present invention, the sender 10 can choose to use an already created ringing tone that is stored within the MMS multimedia messaging server 50 or choose to edit his own using the ringing tone editing server 30. As previously stated, the sender 10 can also import a ringing tone from a source exterior to the messaging system 35 such as from an Internet site. Within such Internet sites, there typically exists a tick box that asks the sender 10 whether the sender 10 would like the ringing tone sent as an SMS to the message indicating system. The sender 10 simply enters a known virtual telephone number for the server 40 and the Internet site sends the selected ringing tone to the server 40. The server 40 then forwards the selected ringing tone to the sender's handset. Once the ringing tone is sent to the sender's handset, the sender 10 is free to use the selected ringing tone.

The ringing tone editing server 30 allows a sender 10 to edit his chosen ringing tone note-by-note. However, the ringing tone editing server 30 is not limited to note-by-note editing. The ringing tone editing server 30 uses, for example, automatic voice assistance to guide the sender through the editing procedure.

The ringing tone editing server 30 is based on the seven basic notes in music. These notes are given names of alphabet letters from A to G which correspond to different pitches. Also there are additional notes in between the letters called sharps and flats. These notes are represented by putting a sign behind the alphabetic letter. For example a B-sharp is symbolized as "B#". The ringing tone editing server 30 enables a sender 10 to add to a letter one of two possible signs: # for sharp notes and ˆ for flat notes. Accordingly, writing music using the ringing tone editing server 30 is similar to writing text in that a sender 10 simply writes the letters (and signs if needed) which correspond to the pitch of the notes that the sender 10 would like to be played.

Once the sender 10 has chosen his personalized ringing tone, the sender 10 can then create his message. The sender 10 can create either a regular SMS message using the SMS server 40 or the sender 10 can create a multimedia message using the MMS multimedia messaging server 50. The sender 10 is not limited to creating his message using either the SMS server 40 or the MMS multimedia messaging server 50. For example, the sender 10 may also create his message using any type of application exterior to the messaging system 35 and import it into the messaging system 35 to be sent with the ringing tone. For example, the sender 10 can create a message using PC and an Internet application, as provided by many wireless service providers.

When the message is created and the ringing tone is chosen, the message is then sent to the recipient handset 60. The present invention then has the chosen ringing tone played automatically at the recipient's handset 60 when the message arrives at the recipient's handset 60. In a conventional cellular telephone, there is a special signaling channel between the telecom switch 70 and the handset (see OTA, "Over the Air" described in detail in GSM standard 11.14 of the 3GPP-3G Partnership Project at the European Telecommunication Standards Institute 650, route des Lucioles, 06921 Sophia Antipolis, France, Telephone No. +33 4 92 94 42 00, Fax +33 4 93 65 47 16, secretariat@etsi.fr (incorporated herein by reference)).

The command to activate the ring indicating the arrival of the sender's message, comes from the switch 70 to the handset by using the signaling channel. The receiver's ringing tone is stored in the telephone's memory, and when the telephone receives the command to activate the stored ringing tone, the receiver's telephone rings with the activated ring tone. However, in the present invention, the ringing tone editing server 30 asks the switch 70 to send an OTA (Over the Air) command. The OTA command instructs the recipient's handset 60 to play the ringing tone that has been sent with the message.

Although in the preferred embodiment the recipient handset 60 is a cellular telephone, other terminals may be used. For example, the recipient handset 60 may be any type of message receiving apparatus that posses a SIM card such as GSM "powered" PDAs and cellular communication ports.

Figure 2A:
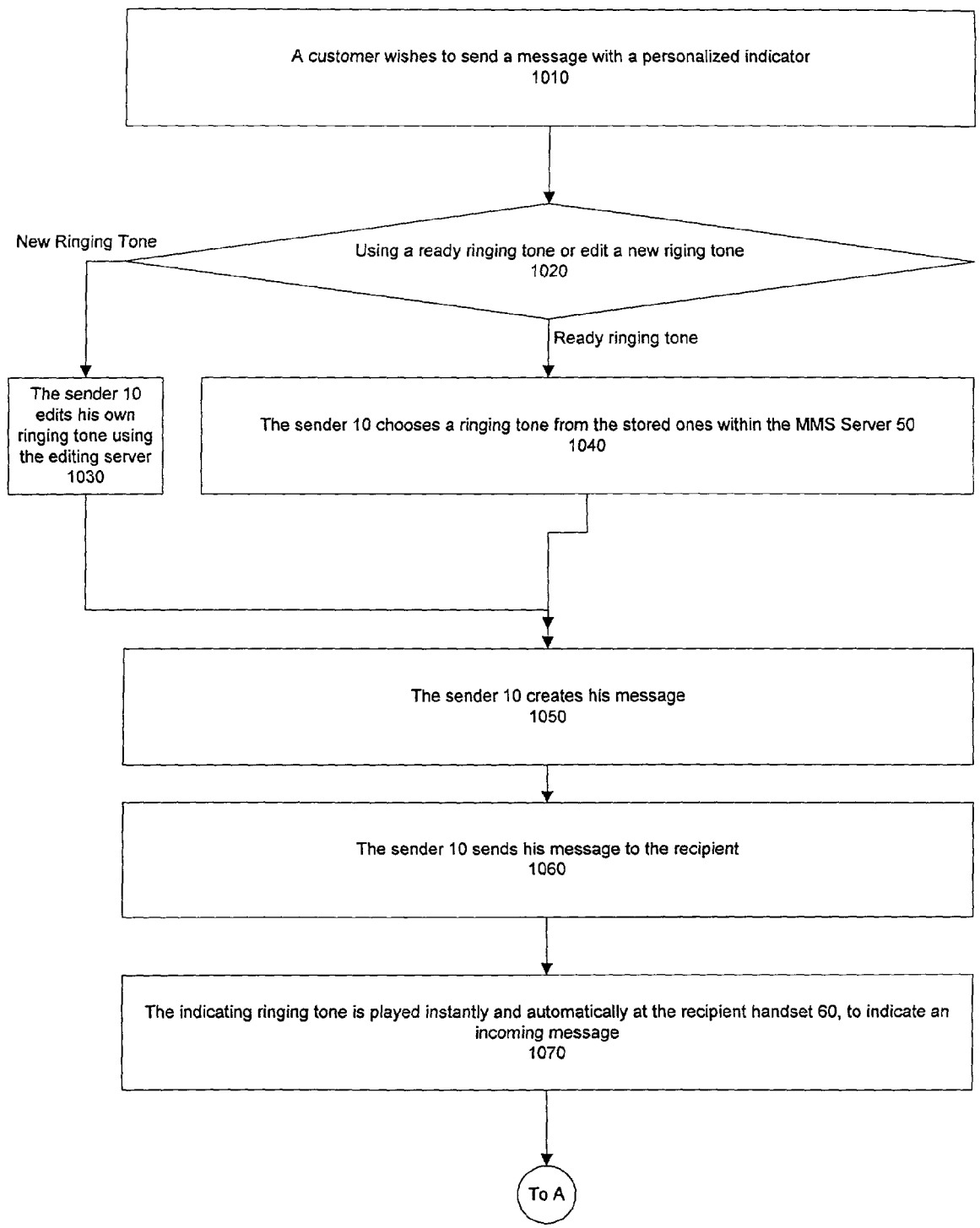
FIGS. 2(a) and 2(b) show a flow chart of the process of the present invention.
Figure 2B:
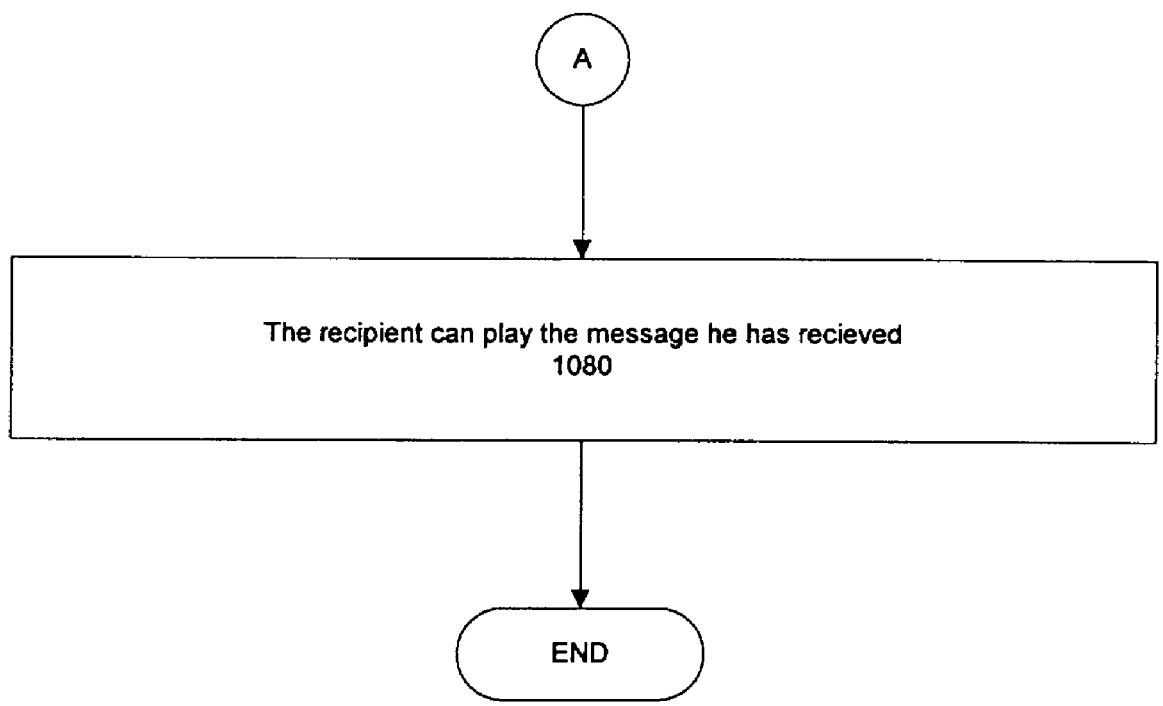

Referring to FIGS. 2(a) and 2(b), the process of a preferred embodiment of the present invention is discussed although this process should not be considered as limiting the present invention. A sender 10 enters the messaging system 35 of the present invention wishing to send a message with a personalized indicator at operation 1010. Upon entering the messaging system 35 of the present invention, the sender 10 is given the option of choosing an already created ringing tone or editing a new ringing tone at operation 1020. If the sender 10 chooses to use an already created ringing tone, then the sender 10 chooses a ringing tone from the ringing tones stored within the MMS multimedia messaging server at operation 1040. However, if the sender 10 chooses to create a new ringing tone, then the sender 10 creates the new ringing tone using the editing server at operation 1030.

After deciding on a personalized ringing tone, the sender 10 then creates his message at operation 1050. The sender 10 can create his message as an SMS message using either an SMS server 40 or the sender 10 can create a multimedia message using a MMS multimedia messaging server 50. The message is then sent to the recipient handset at operation 1060.

The message is subsequently received by the recipient handset 60. Upon arrival of the sender's message, the sender's personalized ringing tone is automatically played on the recipient's handset. This may indicate to the recipient that a message from the particular sender 10 has arrived at operation 1070. Regardless of the settings of the recipient's handset, the recipient's handset will play the personalized ringing tone of the sender (sender) 10. As stated above, the message has a command code within it that takes control of the recipient's handset 60 when the message arrives and plays the ringing tone. The command code within the message instructs the recipient's handset 60 not to ring the usual tone that notifies the message has arrived. Specifically, when a message arrives at the recipient's handset, the message and ringing tone are saved on a SIM card in the recipient's telephone. Modern GSM telephones from at least the Second Generation have advanced SIM cards. These SIM cards include an application enabling software which is called SIM toolkit application. This software and the SIM card is defined by the GSM association in GSM standard 11.14, which is incorporated herein by reference. The present invention may be practiced using this standard although it is not limited thereto. The command code, written according to standard 11.14, sent with the message and ringing tone instructs the proactive SIM toolkit application (within the recipient's telephone) to request control from the CPU of the receipt's telephone. In this way, the incoming message takes control over the recipient telephone's message indicators, ring tones, display . . . etc. Therefore, the sent ringing tone can be played instead of the recipient's usual ringing tone to indicate the arrival of the sender's 10 message.

Part of the message is the ringing tone. The rest of the message will be played only if the recipient chooses to play the message. Thus, only the ringing tone will be played automatically. Once the recipient receives the message, the recipient can play the sender's message at operation 1080.

The recipient may not know who the message is from the first time the sender's ringing tone is played. After the recipient learns what ringing tone the sender 10 has chosen, he will be able to easily recognize who the message is from simply by the ringing tone. For example, if Mary sends a ringing tone that plays "Mary Had a Little Lamb", the recipient may not know who the message is from the first time the recipient's handset 60 played "Mary Had a Little Lamb" (unless, for example, Mary told the recipient what her ringing tone was prior to sending the message). However, the next time the recipient's handset 60 played "Mary Had a Little Lamb", the recipient would know that a message had arrived from Mary.

Although the above described a preferred embodiment, other embodiments are also available. For example, in another embodiment of the present invention, the sender 10 chooses a ringing tone from a source exterior to the messaging system 35. The sender 10 may also edit a ringing tone using an editing application that is also exterior to the messaging system 35. Along those same lines, a sender 10 may also acquire/download a ringing tone from the MMS multimedia messaging server 50 and use an editing application that is exterior to the messaging system 35. Another example may be adapting the present application to automatically use the indicating ringing tone on the recipient's personal computer or fixed telephone.

Additionally, the present invention can be adapted to eliminate the need for the ringing tone editing server 30 and/or one of the MMS or SMS servers. For example, the present invention can be adapted to use only the SMS server and allow the sender to choose a ringing tone from one of many stored in the SMS server.

What is claimed is:

1. A method of creating a message including a ringing tone comprising:
   accessing a server operable to create messages;
   creating a message by a sender;
   selecting a ringing tone by the sender from said server; and
   combining said ringing tone with said message by said server, wherein said ringing tone becomes a header of said message so said ringing tone selected by the sender is automatically played upon receipt of said message by a receiver.

2. The method of claim 1, wherein the sender accesses the server using a cellular telephone.

3. The method of claim 1, wherein the sender accesses the server using a personal computer.

4. The method of claim 1, wherein the sender accesses the server using a fixed telephone line device.

5. The method of claim 1, wherein the server is an MMS multimedia messaging server; and
   wherein the message created by the sender using the MMS multimedia server is a multimedia message.

6. The method of claim 5, wherein the sender accesses the server using a cellular telephone.

7. The method of claim 5, wherein the sender accesses the server using a personal computer.

8. The method of claim 5, wherein the sender accesses the server using a fixed telephone line device.

9. The method of claim 1, wherein the server is an SMS messaging server; and
   wherein the message created by the sender using the SMS messaging server is a SMS message.

10. The method of claim 9, wherein the sender accesses the server using a cellular telephone.

11. The method of claim 9, wherein the sender accesses the server using a personal computer.

12. The method of claim 9, wherein the sender accesses the server using a fixed telephone line device.

13. The method of claim 1, wherein the server is operable to create and edit message indicating ringing tones.

14. The method of claim 13, wherein the sender accesses the server using a cellular telephone.

15. The method of claim 13, wherein the sender accesses the server using a personal computer.

16. The method of claim 13, wherein the sender accesses the server using a fixed telephone line device.

17. The method of claim 13, wherein the sender creates the message indicating ringing tone using a source exterior to the message indicating system.

18. The method of claim 13, wherein the message indicating ringing tone created by the sender is downloaded via an Internet connection to the server.

19. The method of claim 1, wherein said ringing tone comprises a string of alphabetic letters, wherein each alphabetic letter represent a specific musical tone.

20. The method of claim 19, wherein the message is a voice message of the sender recorded by the server.

21. The method of claim 1, wherein the server is an MMS multimedia server.

22. A message indicating system in which a sender sends a message to a receiver, comprising:
   a messaging server operable to create a message;
   a storage server operable to store a plurality of different message indicating ringing tones, and
   wherein a message indicating ringing tone selected from the storage server by a sender is played automatically by a receiving unit of a receiver when the message created by the sender using the messaging server arrives at the receiving unit, wherein said ringing tone is combined with the message, and wherein said ringing tone becomes a header of the message so the ringing tone is automatically played upon receipt of the message by the receiver.

23. The message indicating system of claim 22, wherein the messaging server is an MMS multimedia messaging server; and
   wherein the message created by the sender using the MMS multimedia messaging server is a multimedia message.

24. The message indicating system of claim 23, wherein the sender accesses the message indicating system using a cellular telephone.

25. The message indicating system of claim 23, wherein the sender accesses the message indicating system using a personal computer.

26. The message indicating system of claim 23, wherein the sender accesses the message indicating system using a fixed telephone line device.

27. The message indicating system of claim 22, wherein the messaging server is an SMS messaging server; and
wherein the message created by the sender using the SMS messaging server is an SMS message.

28. The message indicating system of claim 27, wherein the sender accesses the message indicating system using a cellular telephone.

29. The message indicating system of claim 27, wherein the sender accesses the message indicating system using a personal computer.

30. The message indicating system of claim 27, wherein the sender accesses the message indicating system using a fixed telephone line device.

31. The message indicating system of claim 22, wherein the storage server is operable to create and edit message indicating ringing tones.

32. The message indicating system of claim 31, wherein the sender accesses the message indicating system using a cellular telephone.

33. The message indicating system of claim 31, wherein the sender accesses the message indicating system using a personal computer.

34. The message indicating system of claim 31, wherein the sender accesses the message indicating system using a fixed telephone line device.

35. A method of indicating arrival of a message sent by a sender, comprising:
providing a message indicating ringing tone by a sender; and
ringing a receiver's receiving unit with the message indicating ringing tone provided by the sender upon arrival of the sender's message at the receiver's receiving unit, wherein said ringing tone is combined with the message, and wherein said ringing tone becomes a header of the message so the ringing tone is automatically played upon receipt of the message by the receiver.

36. The method of indicating arrival of a message of claim 35, further comprising:
creating the message;
sending the message and the message indicating ringing tone to the receiving unit; and
using the message indicating ringing tone provided by the sender instead of a ringing toe stored in the receiving unit.

37. The method of indicating arrival of a message of claim 36, wherein the message created is an SMS message.

38. The method of indicating arrival of a message of claim 36, wherein the message created is a multimedia message.

39. The method of indicating arrival of a message of claim 36, wherein the message indicating tone is chosen from a plurality of different message indicating tones.

40. The method of indicating arrival of a message of claim 36, wherein the message indicating tone is created by the sender.

41. The method of indicating arrival of a message of claim 36, wherein the message indicating tone is created using the sender unit's keypad.

42. The method of indicating arrival of a message of claim 36, wherein the message indicating tone is created using an Internet site.

43. A message indicating system in which a sender sends a message to a receiver, comprising:
a server operable to create a message containing a sender-selected ring tone,
wherein the sender-selected ring tone is played automatically by a receiving unit when the message created by the server arrives at the receiver's receiving unit, wherein said ringing tone is combined with the message, and wherein said ringing tone becomes a header of the message so the ringing tone is automatically played upon receipt of the message by the receiver.

44. The message indicating system of claim 43, wherein said server is operable to create ring tones.

45. The messaging indicating system of claim 44, wherein said server allows a sender to create ring tone on a note by note basis.

46. The message indicating system of claim 43, wherein said server allows a sender chose among a plurality of stored ring tones.

47. A method of creating a message including a ringing tone comprising:
accessing a server operable to create messages;
creating a message by a sender;
creating a ringing tone by the sender using said server; and
combining said ringing tone with said message by said server, wherein said ringing tone becomes a header of said message so said ringing tone selected by the sender is automatically played upon receipt of said message by a receiver.

48. The method of claim 47, wherein said ringing tone comprises a string of alphabetic letters, wherein each alphabetic letter represents a specific musical tone.

49. The method of claim 48, wherein the sender creates the ringing tone by selecting a series of alphabetic letters.

50. The method of claim 49, wherein the sender accesses the server using a cellular telephone and selects the series of alphabetic letters using a keypad of the cellular telephone.

51. The method of claim 47, wherein the sender accesses the server using a cellular telephone.

52. A method of receiving from a sender a message-indicating ringing tone message by a receiver's receiving unit comprising:
receiving an over-the-air command from a telecom switch;
receiving a message from the sender which includes a message-indicating ringing tone; and
using the message-indicating ringing tone instead of a ringing tone stored in the receiver's receiving unit to indicate arrival of the message;
wherein said over-the-air command causes the receiving unit to use the message-indicating ringing tone, wherein said ringing tone is combined with the message, and wherein said ringing tone becomes a header of the message so the ringing tone is automatically played upon receipt of the message by the receiver.

53. The method of claim 52, wherein the receiving unit is a cellular telephone.

54. The method of claim 52, wherein the receiving unit includes a SIM card that supports SIM toolkit.

55. The method of claim 52, wherein said message-indicating ringing tone comprises a string of alphabetic letters, wherein each alphabetic letter represent a specific musical tone.

56. A message indicating system comprising:
an MMS multimedia messaging server operable to create MMS messages;
an SMS server operable to create SMS messages;

a telecom switch operable to send over-the-air commands to cellular telephones; and a ringing tone editing server operable to create new ringing tones and store a plurality of ringing tones, wherein the ringing tone editing server is interconnected to said MMS multimedia messaging server and said SMS server, wherein messages created by said MMS multimedia messaging server or said SMS server are combined with a ringing tone selected or created by a sender into a message-indicating message and sent to a receiver's cellular telephone, wherein said ringing tone becomes a header of the message so that the ringing tone is automatically played upon receipt of the message by the receiver, wherein said telecom switch sends an over-the-air command to the receiver's cellular telephone, said over-the-air command causes the receiver's cellular telephone to play the ringing tone of the message-indicating message instead of a different ringing tone stored in the receiver's cellular telephone upon arrival of the message at the receiver's cellular telephone.

57. A method of creating a message including a ringing tone comprising:

accessing a server operable to create messages;

creating a ringing tone by a sender using said server;

creating a message by the sender; and combining said ringing tone with said message by said server, wherein said ringing tone becomes a header of said message so said ringing tone selected by the sender is automatically played upon receipt of said message by a receiver.

58. The method of claim 57, wherein said ringing tone comprises a string of alphabetic letters, wherein each alphabetic letter represent a specific musical tone.

59. The method of claim 58, wherein the sender creates the ringing tone by selecting a series of alphabetic letters.

60. The method of claim 59, wherein the sender accesses the server using a cellular telephone and selects the series of alphabetic letters using a keypad of the cellular telephone.

61. The method of claim 47, wherein the sender accesses the server using a cellular telephone.

62. A method of creating a message including a ringing tone comprising:

accessing a server operable to create messages;

selecting a ringing tone by a sender from said server;

creating a message by the sender; and combining said ringing tone with said message by said server, wherein said ringing tone becomes a header of said message so said ringer tone selected by the sender is automatically played upon receipt of said message by a receiver.

63. The method of claim 62, wherein said ringing tone comprises a string of alphabetic letters, wherein each alphabetic letter represent a specific musical tone.

64. The method of claim 63, wherein the message is a voice message of the sender recorded by the server.

65. The method of claim 62, wherein the server is an MMS multimedia server.

66. A method for sending a message and a ringing tone from a sender to a receiver's telephone, comprising:

a sender creating a message and selecting a ringing tone;

sending by the sender the created message and the selected ringing tone to the receiver's telephone; and playing back the ringing tone on the receiver's telephone in response to receiving the message from the sender, wherein said ringing tone is combined with the message, and wherein said ringing tone becomes a header of the message so the ringing tone is automatically played upon receipt of the message by the receiver.

* * * * *